United States Patent [19]

Loesch et al.

[11] 4,030,223
[45] June 21, 1977

[54] FISH LINE CONTROL APPARATUS WITH MAGNETIC RELEASE

[76] Inventors: Leo J. Loesch; Claude E. Loesch, both of Kimball, Minn. 55353

[22] Filed: May 2, 1975

[21] Appl. No.: 573,956

[52] U.S. Cl. .................................... 43/15; 43/17; 43/21.2; 43/43.11; 43/44.88
[51] Int. Cl.² .................................... A01K 97/12
[58] Field of Search ............... 43/15, 16, 17, 27.4, 43/19.2, 43.11, 21.2, 43.11, 44.88, 44.9

[56] References Cited

UNITED STATES PATENTS

| | | | |
|---|---|---|---|
| 1,571,603 | 2/1926 | Ruggles | 43/16 |
| 2,627,689 | 2/1953 | Sokolowski | 43/16 |
| 2,992,504 | 7/1961 | Cape | 43/19.2 |
| 3,190,026 | 6/1965 | Roszak | 43/17 |

*Primary Examiner*—Warner H. Camp
*Attorney, Agent, or Firm*—H. Dale Palmatier

[57] ABSTRACT

A fish line control apparatus in one form includes an upright rod having an outwardly extending and downwardly swinging arm of soft iron magnetic material and having the line releasably attached to the outer end thereof, the rod having a second arm restrained against downward swinging and having a magnet thereon for retaining the first arm against downward swinging, the magnet being adjustable at various positions toward and away from the pivot of the arm to change the leverage tendering to release the first arm from the magnet. In a second form the mounting for the tilting arm forms a handle which may be hand held, and a pair of support legs for holding the tiltable arm up off the ice, and there also being a thumb operated portion of the tiltable arm so as to retain the arm against tilting by the use of a person's thumb to permit jigging of the lure or bait. In another form, the tiltable arm is restrained by a two part magnetic system wherein the two parts of the magnetic system are continually spaced from each other, one of the magnets being adjustable toward and away from the other for increasing the magnetic attraction between the two parts to restrain downward tilting of the arm. Another form incorporates the apparatus in a bobber or float, the floating mount releasably holding the line suspending device which is normally held in place by the magnetic attraction between a two part magnetic system, of which one part is on the line suspending device and the other part is on the float mount.

18 Claims, 20 Drawing Figures

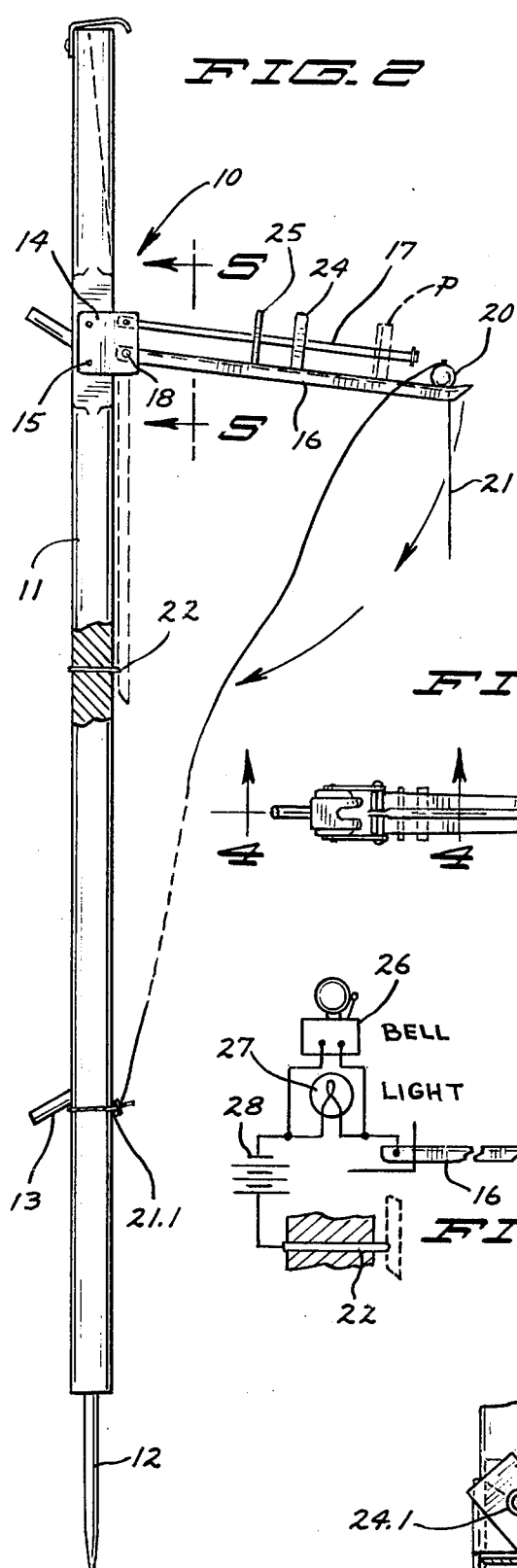
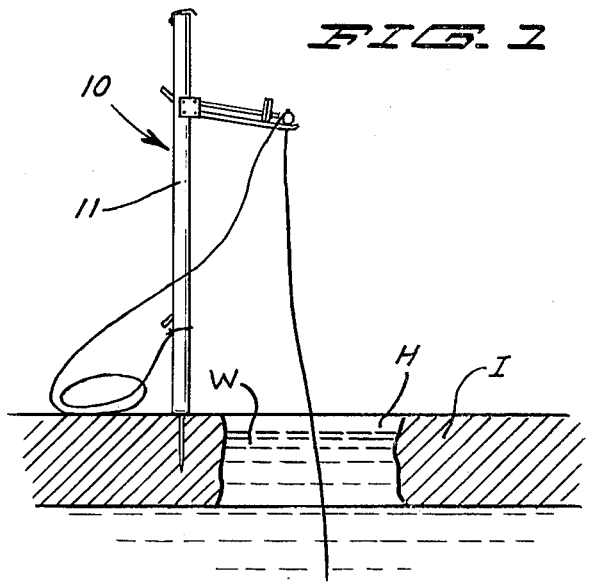
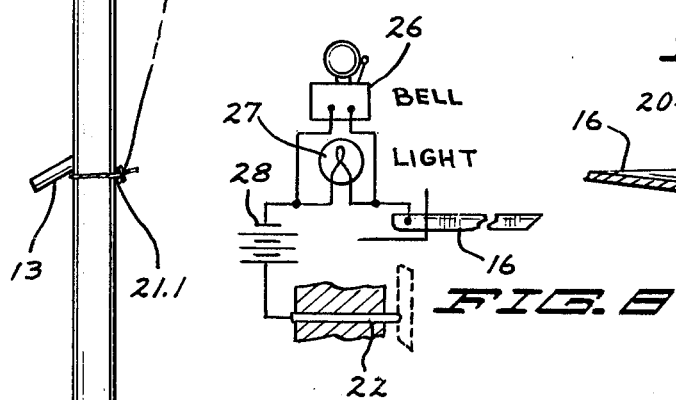
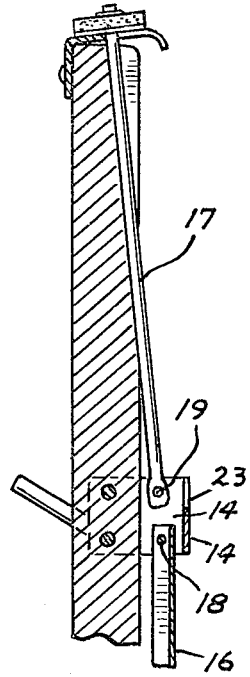
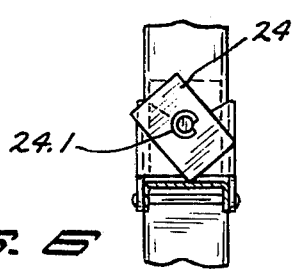
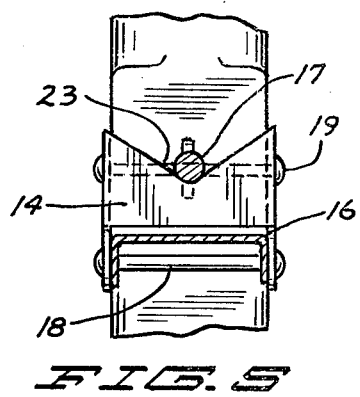

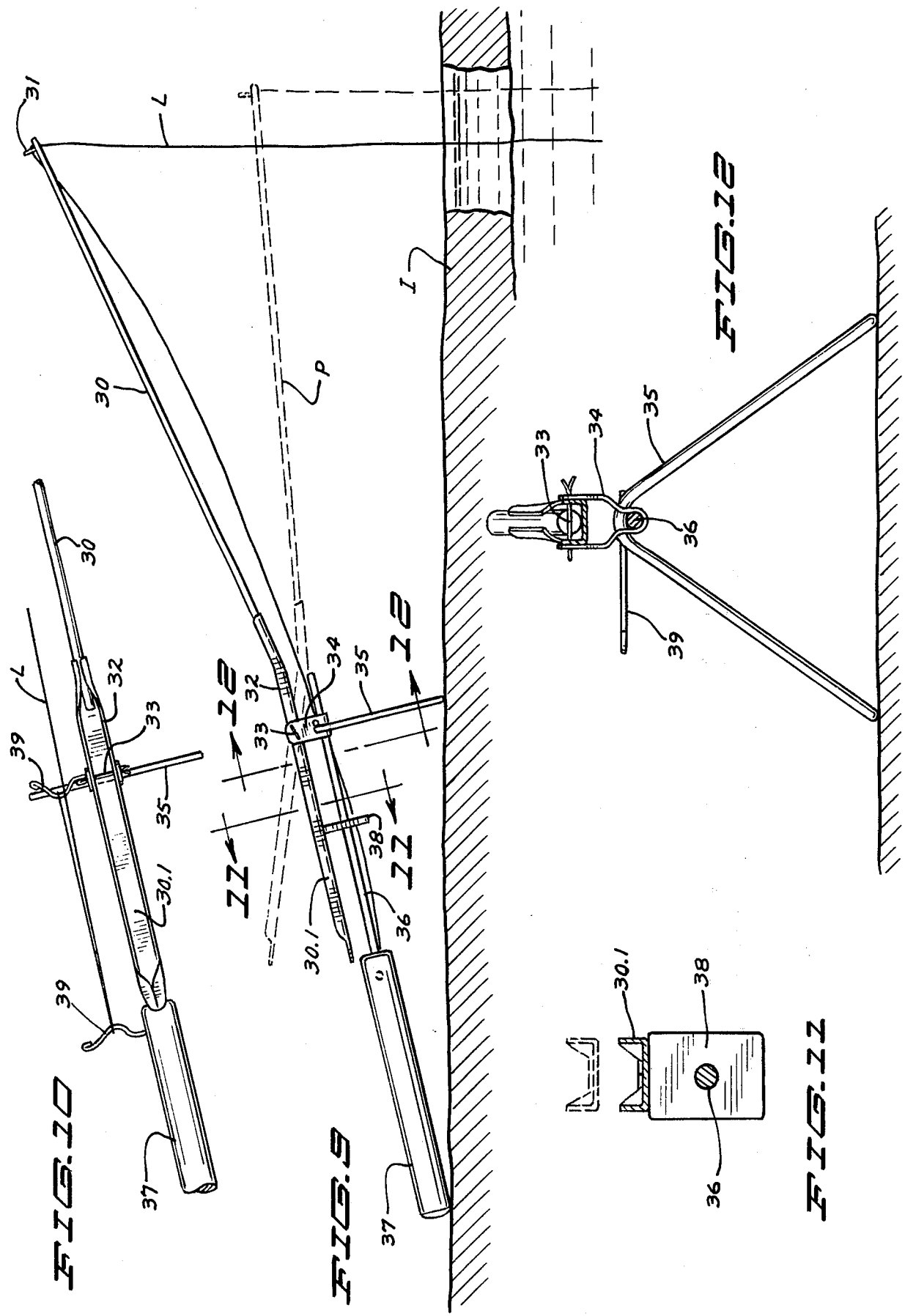

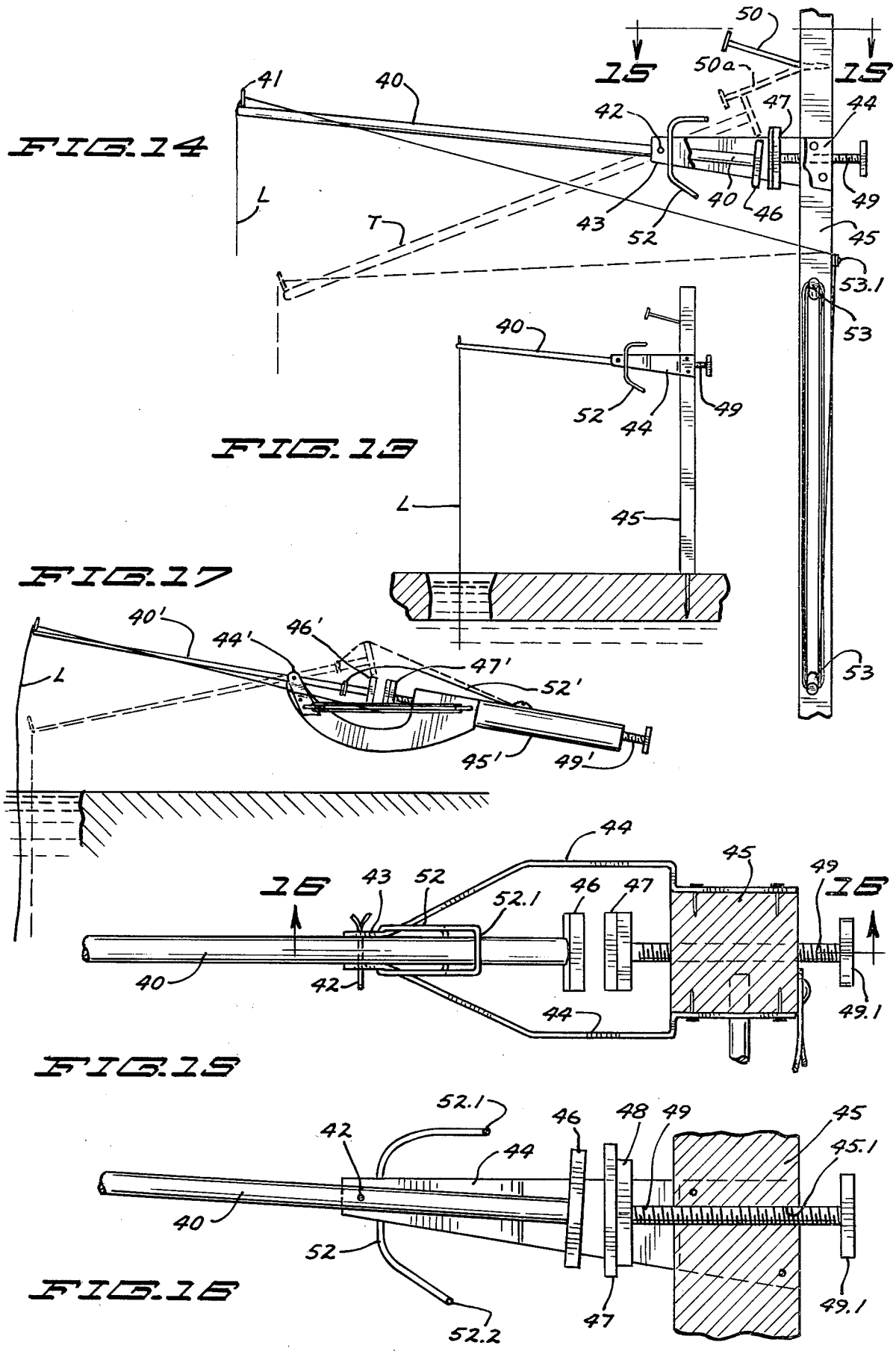

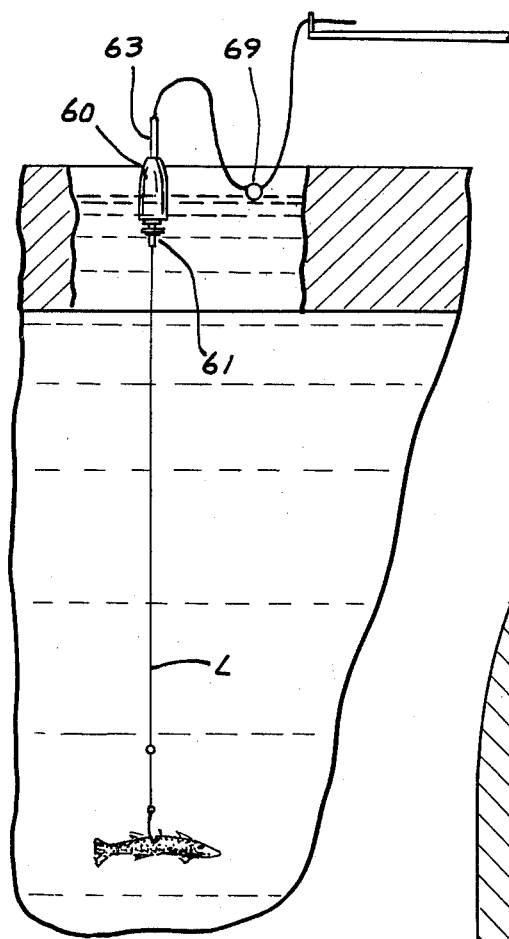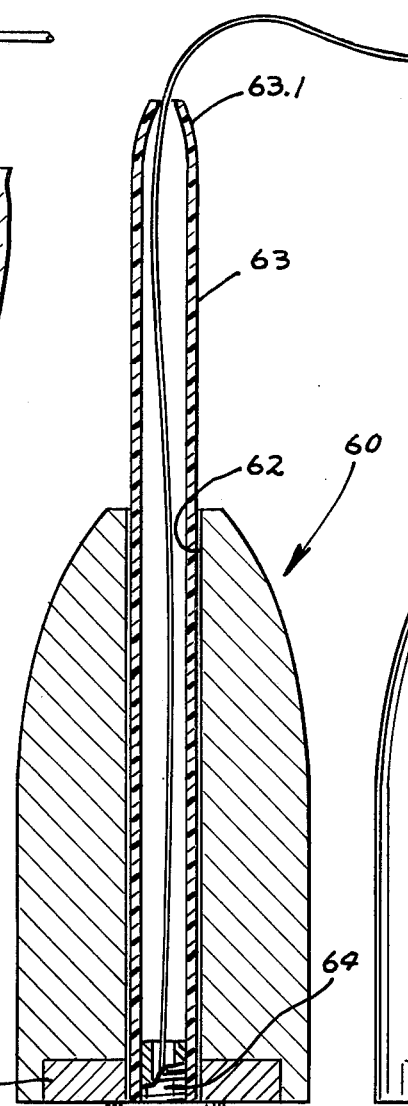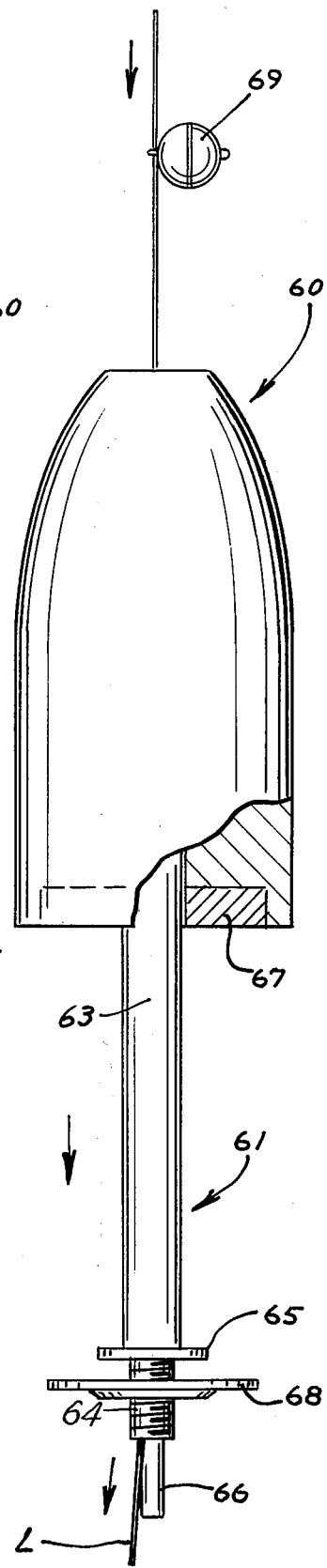

FISH LINE CONTROL APPARATUS WITH MAGNETIC RELEASE

BACKGROUND OF THE INVENTION

In winter fishing in a lake or river, through a hole in the ice, it has been found that when using live bait, the game fish will oftentimes take the live bait in his mouth and swim away with it for a short distance, after which the game fish will eat the live bait so that the hook carrying the bait will be set in the mouth or gullet of the game fish. When the game fish first takes the bait, it is very important that there be an absolute minimum of resistance on the live bait so that the game fish may easily swim away with it. If there is any resistance on the line so as to impede the travel by the game fish with the live bait in its mouth, the game fish will oftentimes, or usually, simply release the live bait and will not swallow the hook so that the game fish may be taken with the hook and line.

It has been observed that even if the bobber or float is sufficiently small so that it barely stays afloat on the surface of the water, this float creates too much resistance to the necessary freedom in taking the live bait and hook.

It will be understood that live bait varies in nature and may constitute a small minnow in the size range of an inch to an inch and a half in length; and such bait is popular for use in fishing crappies, sunfish and other similar panfish. On the other hand, live bait for large game fish such as northern pike, walleyes and sauger, may constitute minnows which are four to eight inches long. When such large live bait is used, the bait itself produces substantial tension on the line and a suitable restraint must be imposed in order to simply prevent the live bait from swimming away with the hook and line, out of the vicinity known to be populated with large game fish.

SUMMARY OF THE INVENTION

The present invention provides a fish line control apparatus which accomplishes the function of releasing the line and bait so that it may travel downwardly into the water, in response to the slightest excess movement of the live bait as may be produced by the game fish. In other words, as soon as the game fish takes the live bait and exerts a slight downward tension or pressure on the line, the fishing line is immediately released and enough slack is allowed to move downwardly with the line so that the game fish will not be frightened away. When a suitable amount of line has been payed out in a downward direction so that the game fish will have an opportunity to swallow the live bait, the line will again be stopped so that the game fish, which will have swallowed the live bait by this time, will be securely hooked by the fish hooks at the end of the line. In some instances it may be necessary to additionally set the hook, but allowing the game fish to run with the hook and live bait for a distance will ordinarily cause the hook to be set by itself.

The present invention initially holds the line at a proper depth so that the live bait is at a location known to be inhabited by the game fish. The line is held with a sufficient degree of tenacity so that the normal wave movement of the water and the normal movement of the live bait on the hook will not cause the line to be released; however, when a game fish of the type sought takes the live bait, the control apparatus immediately releases and allows the game fish to run with the line a short distance. The line is actually retained in its desired position by the result of magnetic attraction between two parts of a magnetic system, which, in the various arrangements, can be very sensitively adjusted so that just exactly the right release point can be obtained.

As will be seen in the various views, the mounting for the apparatus may take several different forms. It may be in the form of an upright rod or pole with a spike on the end of it so that the rod is normally mounted in an upright position when the spike is driven into the ice on the lake for ice fishing. In another form, the mounting may be a hand held framework. In still another form, the mounting for the apparatus may comprise a float to be floated on the body of water, the lake or river in which fish are being sought. The release point of the line due to the tension exerted by the game fish is controllable, through magnetic devices, in a number of ways as seen in the various forms illustrated. In one form, two magnetic parts of the system engage each other, but are adjustable to engage each other at locations of varying distances from the pivot point of a release arm so that different moments of force are caused by tension on the line. In one form where the varying distance between the magnet and the pivot of the movable arm is incorporated, a thumb plate is provided to immobilize the release mechanism, thus allowing "jigging" the lure, or rapid vibration of the rod or pole in order to produce a slight movement of the lure on the line.

In another arrangement of the magnetic system, the two parts of the magnetic system do not ever engage each other, but merely confront each other across a continual air gap so as to restrain the relative movement of the two parts of the magnetic system relative to each other. Such a continual air gap may be worked into a pole arrangement as seen in one form of the invention where the pole is articulated so that the end of the pole comprises an arm which moves downwardly when tension on the line produces the downward movement and the ultimate release of the magnetic system. In another arrangement the float incorporates a construction so that an air gap will usually be employed to obtain the desired sensitivity of release of the line relative to the float. It may also be desirable, as illustrated, to incorporate an alarm device operated in response to release of the two parts of the magnetic system so that the fisherman will be alerted to the fact that a game fish is taking his live bait and lure.

BRIEF DESCRIPTION OF DRAWINGS

FIG. 1 is a general perspective view showing one form of the invention in environment and ready for use.

FIG. 2 is an enlarged elevation view of the invention, partly broken away and in section for clarity of detail and showing a released position of the line supporting arm.

FIG. 3 is a top plan view of the apparatus.

FIG. 4 is a longitudinal detail section view and showing the two arms in storage position.

FIG. 5 is a detail section view taken approximately at 5—5 in FIG. 2.

FIG. 6 is a detail side elevation view showing the relationship between the magnet and line supporting arm.

FIG. 7 is an enlarged detail section taken at 7—7 in FIG. 3.

FIG. 8 is a diagrammatic sketch illustrating a modified form of the invention.

FIG. 9 is an elevation view of the modified form of the invention.

FIG. 10 is a top plan detail view of the form of the invention shown in FIG. 9.

FIG. 11 is an enlarged detail section view taken at 11—11 in FIG. 9 and showing an alternate position in broken lines.

FIG. 12 is an enlarged detail section view taken at 12—12 in FIG. 9.

FIG. 13 is an elevation view of another form of the invention and illustrating its environment and use.

FIG. 14 is an enlarged detail elevation view of the form of the invention illustrated in FIG. 13.

FIG. 15 is an enlarged detail section view taken approximately at 15—15 in FIG. 14.

FIG. 16 is an enlarged detail section view taken approximately at 16—16 in FIG. 15.

FIG. 17 is an elevation view of another modified form of the invention.

FIG. 18 is an elevation view of another modified form of the invention showing its proper environment and use.

FIG. 19 is a greatly enlarged detail section view of the form of the invention illustrated in FIG. 18.

FIG. 20 is an elevation view, partly broken away for clarity of detail, and illustrating the form of the invention of FIG. 18 in a shifted or released position.

DETAILED DESCRIPTION OF THE INVENTION

One form of the invention is shown in the drawings and is described herein. The fish line control apparatus is indicated in general by numeral 10 and includes an elongate pole or rod 11 comprising the frame body of the apparatus and preferably being formed of an insulating material such as wood or substantially rigid plastic. The rod 11 has a spike 12 attached at its lower end so that the spike may be driven into the ice I in the manner illustrated in FIG. 1 for supporting the rod in upright position adjacent the hole H in the ice. The rod 11 has a pair of pegs 13 protruding from one side thereof to facilitate winding the line for storage.

A rigid metal frame strap 14 is affixed by nails or screws 15 to the rod 11 and has a pair of arms 16 and 17 attached thereto by pivot or hinge pins 18 and 19, respectively.

The line suspending arm is formed, in this illustrated embodiment, of galvanized iron sheet metal so as to be magnetically attractable to a permanent magnet. The arm 16 is substantially U-shaped in cross section and tapers to reduced transverse dimensions adjacent its outer end. The outer end of the arm 16 has a longitudinally extending slot 16.1 formed therein so that the outer end 16.2 of the arm has a bifurcated shape. It will be noted that the extreme outer end 16.2 of the arm (see FIG. 7) is deformed slightly so that it will readily cradle a lug 20 which may be attached to the fish line 21. When the lug 20 is cradled on the arm 16 the line 21 extends downwardly through the slot 16.1 and through the hole H and into the water W. The lug 20 may be variously formed, and may be a very small float or bobber which is easily attachable and detachable, and movable along the line. The lug 20 need not have floating characteristics as a float or bobber, but a bobber is convenient to use because it may be readily attached to the line at any desired location. It has been found successful to use a small bobber approximately ½ inch in diameter. Alternately, the lug 20 could simply be a lead sinker which may be easily attached to the line, but the lug should not be excessively heavy so as to sink into the water and pull the line down with a jerk. The main purpose of the lug 20 is to be supported on the arm 16 and to suspend the line 21 from the arm, and to be readily movable along the line to various adjusted positions. As illustrated in FIG. 2, the line 21 may be tied or otherwise attached to the rod 11 as at 21.1. When the rod is set up for use, a substantial amount of slack should be allowed to exist in the line between the lug 20 and the place 21.1 where the line is attached to the rod. The purpose of all this slack is to allow the line to run freely downwardly through the hole as a fish takes the live bait and swims away with it, so that no resistance is initially offered to movement of the line downwardly through the hole.

A metal pin 22 is securely carried by the rod 11 at a location somewhat below the mounting strap 14 so as to be engaged by the arm 16 as the arm 16 swings downwardly to release position. When the arm engages the pin 22, an audible sound is produced to signal the fisherman that a game fish is carrying his line and live bait away.

The second arm 17 is freely swingable in an upward direction on the mounting pin 19. The arm 17 is normally supported in a V-shaped notch 23 in the outer edge of the mounting strap 14. In this way, the arm 17 is held in the position illustrated in FIG. 2, in juxtaposed relation with the line supporting arm 16. The arm 17 serves to support the line suspending arm 16 in this position until arm 16 is released.

A permanent magnet 24, having an aperture 24.1 through it, is mounted on the arm 17 by the arm 17 extending through the aperture 24.1. The magnet 24, in the form illustrated, is magnetized in a direction through its thinnest dimension so that the north and south poles are located at the broad and flat surfaces which lie transversely to the arm 17. An edge of the magnet 24 will engage the arm 16 and be magnetically attracted to it, thereby forming the magnetic coupling or retention of the arm 16 in a predetermined relation to the arm 17. In the arrangement illustrated, the magnet 24 may be moved along the arm 17 so as to be variously spaced, as desired, from the hinge pin 18 of arm 16. As the magnet 24 is moved outwardly toward the outer end of the two arms 17 and 16, a greater tension must be applied to the suspended fish line 21 in order to cause the arm 16 to pull away and be released from the magnet 24; and as the magnet 24 is moved inwardly toward the rod 11 and toward the pivot 18, a proportionately smaller tensile force is required to pull the arm 16 downwardly from the magnet and break the magnetic relationship so as to allow the arm 16 to swing downwardly into line releasing position.

An iron plate 25 is also slidably mounted on the arm 17 and has a mounting aperture therethrough for receiving the arm 17 therein. The iron plate comprises a pole piece or magnetic armature which may be moved into engagement with the magnet 24 as illustrated in the dotted line position P in FIG. 2, or may be maintained away from in spaced relation from the magnet 24 as illustrated in full lines FIG. 2. The purpose of the armature 25 is to concentrate the magnetic field and produce a significantly greater magnetic attraction between the magnet device including magnet 24 and armature 25, and the line suspending arm 16.

The slidability of the magnet 24 along arm 17, and the availability of the armature 25, contribute greatly to the variety of settings obtainable for the required releasing of the arm 16 to swing downwardly into line releasing position. For using small live bait and fishing for small fish such as sunfish and crappies, the armature 25 will be moved inwardly almost against the strap 14 and the magnet 24 will be allowed to remain out of engagement with the armature 25 so as to independently attract the arm 16. In these circumstances, the magnet 24 will be moved inwardly toward the rod 17 so that the arm 16 is only lightly retained and the slightest pressure downwardly on the line 21 will cause the arm 16 to release from the magnet 24 and allow the arm 16 to swing downwardly into line releasing position. When the line is released, the game fish will be able to freely swim away with the live bait and with the line, and the line will fall downwardly through the hole and the lug 20 will be readily carried downwardly into the water as the line and hook are moved away by the game fish. When the arm 16 engages the pin 22, an audible signal is produced and the fisherman will quickly recognize that he should attend to this line. Soon the fisherman will find that the line will stop moving downwardly through the hole, whereupon he can set the hook by pulling the line and bringing in the fish.

When the apparatus is being used with game fish of substantial size, such as northern pike, the live bait will be of considerable size and substantial retention will be required to hold the arm 16 in its upwardly line suspending position against the action of the large live bait minnows. In this instance, the magnet 24 may be moved outwardly along the arm 17 to independently hold the arm 16, or the magnetic attraction between magnet and arm 16 may be increased by sliding the armature 25 into engagement with the magnet 24 and the edge of the armature 25 will also engage the arm 16. In this circumstance, the arm 16 will not be released by the mere movement of the large live bait used to attract the large fish. When a game fish strikes the live bait, the bait will be carried away for a distance as the arm 16 is released and then the game fish will take the entire bait and hook and the hook may then be set by the fisherman if required, and the fisherman may bring in the game fish.

In FIG. 8, a circuit is illustrated to operate a signal when the arm 16 is swung downwardly into the dotted line position against the pin 22. These parts serve as a switch to energize the circuit. The circuit also includes a bell 26 and a light 27, connected in parallel with each other and providing the necessary signal to the fisherman. These signal devices 26 and 27 are connected in series between the battery 28 and the switch parts formed by the arm 16 and pin 22. When the arm swings downwardly into line releasing position, the light will illuminate and the bell will sound to alert the fisherman.

It will be understood that the arm 16 may carry a flag of fabric or thin sheet plastic of a color which is preferably bright and which is preferably a color contrasting with snow and ice which is the environment in which this fishing rod will ordinarily be used. The falling of arm 16 to the line release position illustrated in dotted lines in FIG. 2 will, with the assistance of the flag, produce a significant visual signal for the fisherman.

It may also be desirable in this fishing rod to employ a free running reel upon which the line 21 may be wound, instead of merely using the pegs 13. With such a free running reel, the line may be kept up off the ice so that it does not get stepped on, and tangled, or frozen in. The free running reel will simply pay off the line as is required as the line is drawn down through the hole H by a game fish.

In FIGS. 9 – 12, the fish line control apparatus includes a flexible rod or arm 30 having a line guiding eyelet 31 at its end through which the fishing line L may run freely. The rod or arm 30 is crimped into an iron sheet metal extension 32 which is mounted on pivot 33 so that the arm 30 may tip downwardly to the dotted line position P as illustrated. The pivot 33 is extended through apertures in a pair of upstanding ears 34 which are integral of each other and in one piece and are affixed as by welding to a pair of support legs 35, and also to another rigid rod shaped arm 36 which protrudes rearwardly along the extended portion 30.1 of the arm 30. The rod 36 has a wooden handle 37 affixed thereon. The rod 36 has a magnet 38 slidable therealong toward and away from the pivot 33. The magnet 38 may be formed of any suitable rigid material, and may be an artificial magnet of particles pressed together, or may be a ceramic magnet or other form of commercially available magnet in the shape of a rectangular disc with a hole through the middle. The magnet 38 has one edge which confronts and engages the iron sheet metal extension 30.1 of the arm so as to retain the arm 30.1 against tipping relative to the pivot 33.

It will be noted in FIG. 10 that the line L, in this form, is anchored on a pair of hooks 39 which are respectively rigid with the handle 37 and with the bracket 34. These hooks 39 anchor the line against movement through the eyelet 31 and downwardly into the lake through the ice I.

In this form, when tension is applied by the game fish on the line L, there is a tendency for the arm 30 to swing downwardly toward the dotted line position P illustrated. However, the magnet 38, by the magnetic attraction, holds the rear extension 30.1 of the arm so that the arm is restrained against tipping. When the tension on the line L exceeds that which is desired, according to the nature of game fish being sought, the magnet will release the arm so that the arm will tip to the dotted line position shown. It will be understood that if the magnet 38 is moved a substantial distance toward the pivot 33, then by virtue of the leverage obtained due to the long length of the arm 30 to the line guide 31, the arm 30 will be released from the magnet 38 by only a very slight tension on the line L exerted by the game fish. However, if large game fish are being sought, and if large live bait is being carried on the hook, it may be desirable to move the magnet 38 substantially away from the pivot 33 so as to change the leverage arrangement and thereby increase the release point so that the large size live bait on the hook will not cause the arm 30 to be released from the magnet 38 prematurely. When the magnet 38 is moved away from the pivot, only a larger size fish, such as a large game fish, will cause release of the magnet from the arm so that the arm will tip to the dotted line position.

In any event, when the arm 30 does tip down to the dotted line position shown, the line L will be payed out in a downward direction so as to permit the game fish to run with the live bait a short distance, whereupon if the game fish runs very far with the live bait, the line will become taut again and the hook will be set in the mouth of the game fish.

In the form of the invention illustrated in FIGS. 13 – 16, a swingable arm 40 has a line guiding eyelet 41 at its end, and is swingably mounted on a pivot 42 which also extends through bearing apertures and a pair of rigid mounting ears 43 which comprise the ends of mounting brackets 44. The mounting brackets 44 are affixed as by nails to an elongate rod or pole 45 which, together with the brackets 44, provide the mounting for the line suspending arm or device 40.

The arm 40 may swing downwardly to the dotted line position T shown in FIG. 14, but such swinging movement is normally restrained by the magnetic system which includes a pair of magnets 46 and 47 which will be seen to be oriented in confronting, but spaced relation with each other. The magnets 46 and 47 are ceramic magnets or similar type of manufactured magnets, and are magnetized in a direction through the thinnest dimension so that the pole faces are at the broad, flat surfaces of the magnets. Magnet 46 is affixed to be immovable on the rod 40. Magnet 47 is affixed to an iron or other magnetic metal mounting plate 48 which is securely affixed to a mounting screw 49 which is threaded through a tapped aperture 45.1 in the upright mounting rod 45. The threaded rod 49 has a thumb piece or handle 49.1 affixed on its rear end to facilitate ready and easy turning of the thumb screw for moving the magnet 47 toward and away from the magnet 46.

An adjustable stop pin 50 is mounted in the rod 45 above brackets 44 and extends obliquely outwardly from the rod. The stop pin is mounted in the rod 45 for a swivelling type movement so that it may be rotated to the dotted line position 50a as illustrated in FIG. 14. The stop pin is for the purpose of providing a specific abutment or stop to limit swinging movement of the arm 40 and to create an audible signal when the arm is tipped downwardly as in the dotted line position T as illustrated in FIG. 14. The stop pin 50 may also cooperate with the arm in forming a switch contact for operating an alarm system similar to that illustrated in FIG. 8. It will be noted that the stop pin 50 may be swung out of the way so that the magnet 46 will not engage the stop pin, when it is desired to allow free swinging of the arm.

Another stop wire or bracket 52 is affixed as by welding to the bracket ears 43 and forms loops 52.1 and 52.2 above and below the arm 40 for limiting the maximum swinging of the arm. Pins 53 are affixed on the rod 45 to facilitate anchoring the line L, and a guide 53.1 may also be provided on the rod for guiding the line adjacent the arm 40.

In operation, the line L with the live bait on the hook is suspended into the body of water as illustrated in FIG. 13. Downward swinging of arm 40 which would tend to be caused by the weight of the arm itself, the weight of line L, the hook and any weights that may be on the line, and the live bait, is all restrained by the magnetic attraction between the magnets 46 and 47. If it is desired that there be a substantial restraint to downward tipping of arm 40, then the magnet 47 is adjusted to be in close proximity with the magnet 46; and if it is determined that a lesser restraint against tipping of arm 40 is to be effected, then the magnet 47 is adjusted with screw 49 to be widely spaced from the magnet 46. When the game fish takes the live bait, it is desired that the game fish be able to run with the live bait and the line a short distance, and this is accommodated by allowing downward tipping of the arm 40. The line L is thereby payed out in a downward direction.

The restraint exerted by the magnetic influence between the two magnets 46 and 47 is so balanced that the line and hook and live bait thereon are normally supported in the desired position so that the live bait will be at the level where game fish are known to be found; but the restraint imposed by the magnetic system must be so light as to allow the hook and live bait and line to be moved downwardly through the water with a minimum of resistance.

After the arm 40 has tipped to the dotted line position T, the downward movement of the line and live bait thereon is stopped because the downward tipping of the arm 40 is stopped, preferably by the stop pin 50, in its downwardly swung position 50a. In any event, swinging of the arm 40 is ultimately limited by the rigid wire loop 52, against which the arm 40 will bear.

Of course, it is necessary that the line L be anchored as to the pins 53 on the rod 45 so that the normal position of the line will be accurately controlled.

The form of the invention shown in FIG. 17 is substantially similar to that illustrated in FIGS. 13 – 16, with the principal exception that the mounting rod or handle 45' has a significantly different shape. Tipping of the arm 40' is limited by a cord 52', one end of which is secured to the rear end of arm 40', and the other end of which is anchored by a suitable fastener to the handle 45'. This form of the invention also employs spaced magnets 46' and 47', magnet 47' being carried on a threaded rod 49' which extends entirely through the handle 45' for adjustment of the magnet 47'.

It may be desirable to provide the handle 45' with a pair of support legs at the forward end near the bracket 44' to support the apparatus if it is laid on the ice during ice fishing.

Operation of this form of the invention is substantially the same as that in FIGS. 13 – 16 except that the flexible cord 52' may be operated by the person's thumb in order to return the arm 40' to its normal position after having been tipped.

In the form of the invention illustrated in FIGS. 18, 19 and 20, the mounting 60 for the line suspending device 61 comprises a float, made of wood, cork or hollow plastic. The float mounting 60 has a center passage 62 extending entirely therethrough in a longitudinal direction to slidably and telescopically receive a rigid tubing 63 which comprises a portion of the line suspending device. Tubing 63 has a somewhat tapered upper end 63.1, and the lower end of the tubing has a short metal nipple or tube 64 affixed therein. The outer end portion 64.1 of the tube 64 is externally threaded, and a stop collar or abutment 65 is affixed on the tube 64 to abut against the lower end of the float mount 60. It will be seen that the line L extends through the rigid tube 64 and through the tube 63, and a wooden wedge or pin 66 is inserted into the lower end of tube 64 to wedge the line L against the side of the tube and fix the relationship between the line L and the tube 64 so as to avoid free running of the line through the tube and through the line suspending device 61. In this form, the magnetic system comprises a magnet 67 and a circular metal disc 68 formed of magnetic material, such as soft iron. The disc 68 is threaded onto the threaded end 64.1 of the tube 64 so that its position relative to the magnet 67 is variable and adjustable. The magnet 67 is magnetized in a suitable direction so as to magnetically attract the soft iron plate 68 and retain the line suspending device 61 in assembly with the float mount 60. As depicted in FIG. 18, the line extends downwardly from the lower end of the assembly which floats in the water. The line suspending device including the tube 64, disc 68, tube 63, and the wedge pin 66 will slide very freely downwardly from the float mount 60 when the magnetic relationship between the disc 68 and the magnet 67 is released. Normally the attraction between the magnet 67 and the disc 68 is sufficient as to maintain the line suspending device 61 in assembly with the float mount 60, and as to additionally suspend the line L and the hook and live bait thereon. The spacing between the magnet 67 and the disc 68 can be very closely controlled and adjusted so that as soon as a game fish touches the live bait on the hook, the magnetic system will release and allow the line suspending device 61 to slide downwardly through the float mount 60, thus allowing the game fish to take the live bait and hook and line downwardly as he desires. An obstruction or lug 69 on the line L above the tube 63 may be employed to stop the downward movement of the line suspending device 61 and the hook and line so that the game fish is not allowed to run excessively far with the live bait. The lug 69 may take the form of a small bobber or float. When the lug 69 engages the upper end of the float mount 60 after the line suspending device 61 moves downwardly with the line from the float mount, the hook and live bait will be stopped rather suddenly and the hook will be caused to be set in the game fish mouth. Of course, above the lug 69, the line may be attached to any type of fishing pole or other holding apparatus, or, as is oftentimes the case, it may not be necessary to use any pole at all.

In FIG. 20, the line suspending device 61 is shown in a shifted position, having moved downwardly from its original position as the line is moved downwardly under the influence of a game fish.

If it is desired to use larger size live bait on the hook, when fishing for larger game fish, the soft iron disc 68 will be adjusted along the threaded tube 64.1, closer to the magnet 67, which is affixed in the lower end of the float mount 60 so as to cause a greater magnetic attraction between the magnet and disc 68, thereby requiring greater tension on the line and a greater force to releasably separate the plate 68 from the magnet 67.

As an alternative to adjustably mounting disc 68 on the threads of metal tube 64, the disc 68 might be affixed to the end of tube 63, and tube 64 may be eliminated. One or more non-magnetic washers or spacers may be removably mounted on disc 68 (and around tube 63) to predetermine the spacing between magnet 67 and disc 68. Such washers may be of non-metallic material such as fiber, plastic, or rubber, or of light or heavy metals such as aluminum, brass, or lead, as required.

It will be seen that we have provided an apparatus to control a fish line so that the line will be instantaneously released the moment that a game fish strikes the live bait suspended on a hook. The control apparatus supports the hook and live bait adequately to prevent the line from being released due to the normal wave action or due to the normal movement of the live bait on the hook. If the live bait is more vigorous in its action, the degree to which the line is held is increased, but the degree to which the line is held against any significant downward movement may be minutely varied so that the slightest additional movement caused by a game fish in his efforts to pull the live bait away will cause the line to be released, thus allowing the game fish to have the bait and to run with it a short distance as he desires.

The present invention includes a line suspending device in each of the different forms, and an attachment device to prevent the line from running downwardly with respect to the line suspending device. The line suspending device is carried by an independently supported mounting which may be hand held, may be supported on the ground adjacent the water, or on the ice adjacent the hole through which the fishing is carried out, or otherwise the mounting may be a float to be supported directly on the water. A highly adjustable magnetic system is incorporated with one part of the magnetic system being incorporated into the line suspending device, and the other part of the magnetic system being incorporated into the independently supported mounting. At least one of the parts of the two part magnetic system is adjustable so that the degree of action on the line required to release the two part magnetic system will be highly controllable. In one arrangement, the two parts of the magnetic system actually engage each other, and the ease with which they are separated is adjusted by moving one of the magnetic parts toward and away from the pivot of the swingable arm so as to change the leverage applied and the relative moment of force causing release of the two part magnetic system.

In another arrangement, the two parts of the magnetic system do not engage each other but continually maintain an air gap between the two parts which air gap may be increased or decreased, depending upon the tenacity with which it is desired that the two parts attract each other.

What is claimed is:
1. A fish line control apparatus comprising:
a line suspending device,
attachment means retaining the line against downward travel relative to the device,
an independently supported mounting with means carrying said suspending device to allow movement of the device without significant restraint or impetus in the direction of line movement, and
the mounting and device incorporating a two part magnetic system, one part of the system being incorporated into the mounting, and the other part of the system being incorporated into the device, the two parts of the magnetic system having magnetic attraction for each other and being arranged to releasably restrain the device from moving with the line, the magnetic system having releasing characteristics for releasing the line suspending device in response to tension on the line resulting from action of a game fish, the transmission of line tension to the attachment means and the magnetic forces of the magnetic system providing the only influence upon the suspending device controlling restraint and release of the device in response to such tension on the line, the attachment means and the magnetic system operating alternately and to the exclusion of other influences on the suspending device to effect restraint and release of the device to move unidirectionally upon release.
2. A fish line control apparatus comprising:
a line suspending device including a substantially horizontally extending first arm having an outer end from which the line is suspended, and the outer end being swingable downwardly to pay out the line in a downward direction, attachment means retaining the line against downward travel relative to the device, an independently supported mounting carrying said suspending device to allow movement of the device in the direction of line movement, the mounting including a pivotal connection for said first arm and also including a second arm in juxtaposed relation to said first arm, the mounting device incorporating a two part magnetic system, one part of the system being incorporated into the mounting, and the other part of the system being incorporated into the device, the two parts of the magnetic system having magnetic attraction for each other and being arranged to releasably restrain the device from moving with the line, the magnetic system releasing the line suspending device in response to tension on the line resulting from action of a game fish, the magnetic system including a magnet on one arm and the magnetic material of the other arm mutually attracted to each other and releasing in response to tension on the line causing downward swinging of the first arm.

3. The fish line control apparatus according to claim 2 and the attachment means includes an anchor securing the line on the first arm.

4. A fish line control apparatus according to claim 2 and the attachment means includes a line anchoring device on the mounting.

5. The fish line control apparatus according to claim 1, there continually being an air gap between the two parts of said magnetic system, the two parts of the magnetic system being arranged for movement along each other as the suspending device is moved relative to the mounting.

6. The fish line control apparatus according to claim 5, and there being a pivotal connection between said mounting and said line suspending device.

7. The fish line control apparatus according to claim 6 and one of the parts of said magnetic system being adjustable toward and away from the other of the parts to vary the air gap therebetween.

8. The fish line control apparatus according to claim 2 wherein at least one of the parts of the magnetic system being movable toward and away from the pivotal connection to change the location relative to the pivotal connection at which said two parts are magnetically attracted to each other.

9. The fish line control apparatus according to claim 2 wherein both of the first and second arms extend from said pivotal connection in the same direction and toward the outer end of said first arm.

10. The fish line control apparatus according to claim 9 and said mounting including a rigid rod, said second arm being pivotally mounted on the rod for swinging away from said first arm, and said first arm being pivotally inwardly against the rod.

11. The fish line control apparatus according to claim 2 and the first arm and second arm extend from said pivotal connection in substantially the same direction away from the outer end of the first arm.

12. The fish line control apparatus according to claim 11 and said second arm forming a handle for manually manipulating the apparatus.

13. A fish line control apparatus comprising:

a line suspending device, attachment means retaining the line against downward travel relative to the device, said attachment means includes a releasable anchor securing the line on said suspending device, said anchor releasing the line from the suspending device in response to movement of the suspending device relative to the mounting, an independently supported mounting carrying said suspending device to allow movement of the device in the direction of line movement, and the mounting and device incorporating a two part magnetic system, one part of the system being incorporated into the mounting, and the other part of the system being incorporated into the device, the two parts of the magnetic system having magnetic attraction for each other and being arranged to releasably restrain the device from moving with the line, the magnetic system having releasing characteristics for releasing the line suspending device in response to tension on the line resulting from action of a game fish, the transmission of line tension to the attachment means and the magnetic forces of the magnetic system providing the only influences upon the suspending device controlling restraint and release of the device in response to such tension on the line, the attachment means and the magnetic system operating alternately and to the exclusion of other influences on the suspending device to effect restraint and release of the device to move unidirectionally upon release.

14. The fish line control apparatus according to claim 13 wherein said attachment means is releasably connectable to the line permitting adjusting the relative position of the line along the attachment means.

15. The fish line control apparatus according to claim 1 wherein said line suspending device includes line guides on the device permitting free movement of the line therealong, and said attachment means also includes a line anchor on the mounting restricting paying out of the line along the suspending device.

16. The fish line control apparatus according to claim 1 and said mounting comprising a float.

17. The fish line control apparatus according to claim 16 and the line suspending device and the mounting being freely slidable one within the other and normally assembled with each other, the magnetic system releasably retaining the mounting and suspending device in assembly with each other.

18. The fish line control apparatus according to claim 17 and said suspending device forming a removable core of the float mounting, said mounting and core having cooperating stop means limiting upward movement of the core into the float mounting, the magnetic system being disposed at the lower end of the assembled float mounting and core, one of the parts of the magnetic system being threadedly adjustable along the core for movement and adjustment toward and away from the other magnetic part.

* * * * *